(12) United States Patent
Burke et al.

(10) Patent No.: US 6,511,270 B1
(45) Date of Patent: Jan. 28, 2003

(54) BED LINER CARGO CLAMP AND SYSTEM

(76) Inventors: Thomas Burke, #5 Matheson Rd., Oldwick, NJ (US) 08889; Glenn M. Sigley, 4759 S. Cypress Dr., Walnutport, PA (US) 18088

( * ) Notice: Subject to any disclaimer, the term of this patent is extended or adjusted under 35 U.S.C. 154(b) by 0 days.

(21) Appl. No.: 09/965,468

(22) Filed: Sep. 28, 2001

(51) Int. Cl.[7] ................................................ B60P 7/08
(52) U.S. Cl. ...................... 410/94; 410/90; 410/121; 410/97; 410/101; 410/102
(58) Field of Search ........................ 410/94, 101–102, 410/90, 91, 121, 95, 155, 97; 296/39.2; 188/32

(56) References Cited

U.S. PATENT DOCUMENTS

| | | | | |
|---|---|---|---|---|
| 4,311,420 A | * | 1/1982 | Hendricks et al. | 410/121 |
| 4,941,784 A | * | 7/1990 | Flament | 410/121 |
| 4,955,771 A | * | 9/1990 | Bott | 410/94 |
| 5,161,762 A | | 11/1992 | Stewart et al. | |
| 5,549,428 A | | 8/1996 | Yeatts | 410/94 |
| 5,636,951 A | * | 6/1997 | Long et al. | 410/85 |
| 5,655,863 A | * | 8/1997 | Mundt | 410/94 |
| 5,689,864 A | | 11/1997 | White | |
| 6,012,885 A | * | 1/2000 | Taylor et al. | 410/94 |
| 6,176,657 B1 | * | 1/2001 | Romph | 410/94 |
| 6,244,802 B1 | * | 6/2001 | Stanesic et al. | 410/94 |
| 6,322,301 B1 | * | 11/2001 | Zavitz | 410/91 |

* cited by examiner

*Primary Examiner*—S Gordon
(74) *Attorney, Agent, or Firm*—Stephen G. Matzuk

(57) ABSTRACT

A clamp to be placed against payload objects carried in a truck or other vehicle including a corrugated bed liner comprising one or more pairs of movable opposing jaws, each pair selectively engaging a portion of the truck bed liner. The clamp jaws are slidebly retained in grooves in a clamp frame, and moved by spirally disposed grooves in a disk rotated by a connected operator lever. Further improvements include anchoring apertures to further secure the object(s) with rope or strapping, and latching apparatus to maintain the clamp in a closed or "engaged" position relative to the bed liner.

16 Claims, 2 Drawing Sheets

BED LINER CARGO CLAMP AND SYSTEM

FIELD OF THE INVENTION

The present invention relates to cargo clamps, and more particularly, to cargo clamps and mating truck bed liners to which the clamps are secured to limit the movement of the cargo thereon.

BACKGROUND OF THE INVENTION

Transportation of large, unsecured goods or payloads in shipping and transport vehicles such as trucks, vessels and other movable vehicles, creates a hazard due to object shifting movement during transport. To prevent this hazard, such objects are typically fastened to the walls of the vehicle with straps or ropes, which requires convenient attachment points for both the article transported and on the floor and the wall surface of the transport vehicle. Such strap or rope securing requires multiple fastening points, is tedious, difficult to quickly set up and undo if access to the articles are required. As a result, goods, and especially smaller packages and items are carried unsecured due to the inconvenience of securing the goods.

When smaller truck, e.g. 'pick-up' style truck is used, the interior floor, or 'bed' is often lined with a rigid formed heavy plastic aftermarket bed liner to protect the interior of the truck bed, and to add a perceived improved aesthetic effect. The bed liner often reduces the friction between the transported articles and the truck bed as well as covering convenient points which would serve to anchor the transported article, discouraging the securing of the goods. Thus, the truck bed liners often exacerbate the pickup truck operators' problems of securing goods, who place a premium on ease of operation while not detracting from the usefulness or esthetics of the aftermarket truck products used. Moreover, movement between the container of the flammable material and the bed liner can generate static electricity which could cause combustion and explosion of flammable material such as from a small gas can, especially in closed-in pick-up trucks.

SUMMARY OF THE INVENTION

The cargo clamp and bed liner anchoring system according to the present invention includes a pick-up truck bed liner and one or lever-operated clamp which placed against the transported article or goods and engages the bed liner to secure the article or goods to the truck bed. According to the present invention, the truck bed liner typically has regularly spaced protrusions extending outward from the plane of the bed liner, which are grasped by the clamp(s). Typically, the bed liner comprises a corrugated polymer having regular corrugation intervals of 1–3 inches. The regularity of the corrugated interval permits the clamp(s) according to the present invention to be attached virtually anywhere within the field of uniform corrugation. The clamp includes cam lever operated pairs of confronting jaws which engage or capture the bed liner protrusions. Moreover, the clamp(s) according to the present invention provide anchoring points to further secure the goods. Thus, the clamp and anchoring system according to the present invention provides high utility while maintaining ease of use and complementing the aesthetics of the bed liner.

BRIEF DESCRIPTION OF THE DRAWING

These and further features of the present invention will be better understood by reading the following Detailed Description together with the Drawing, wherein.

DETAILED DESCRIPTION OF THE INVENTION

Figure 1:
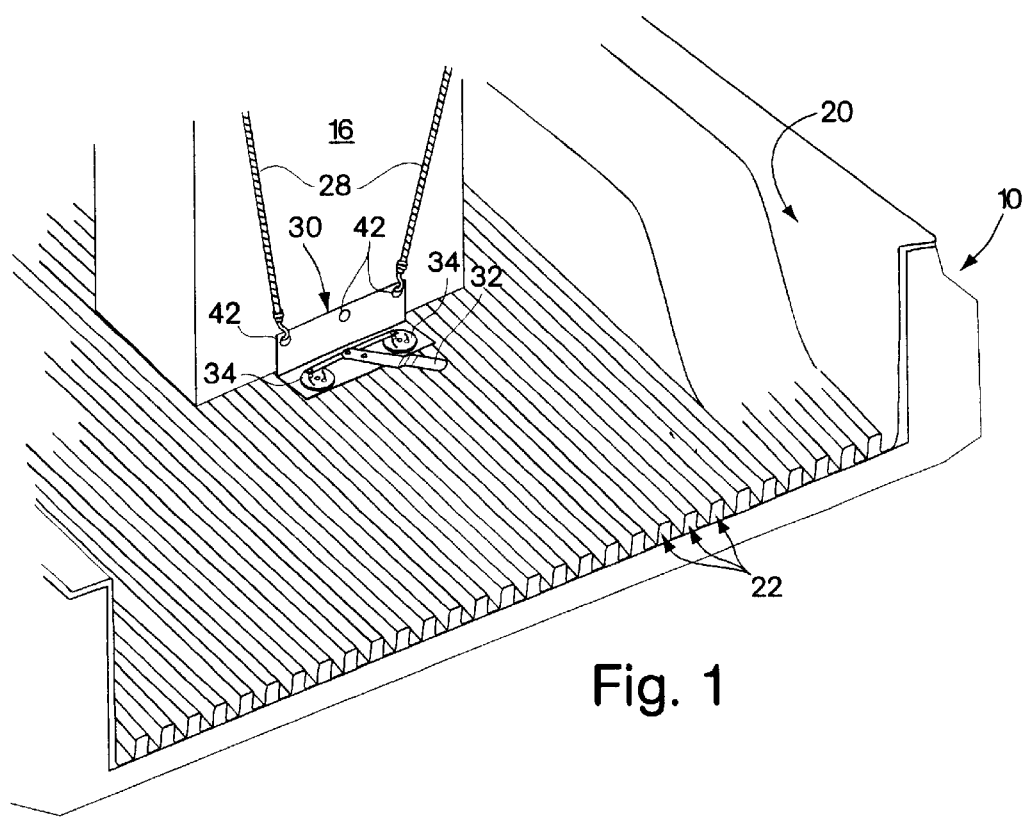
FIG. 1 is a perspective view of the cargo clamp and system in service according to one embodiment of the present invention.

A perspective view of the cargo clamp and system according to one embodiment of the present invention is shown in FIG. 1, wherein the clamp 30 is secured to the corrugated ridges of a truck 10 bed liner 20 and juxtaposed against cargo 16 to limit its movement on the truck 10 bed liner as the truck 10 travels about. The clamp 30 is laterally and vertically secured to the corrugations 22 by operation of a handle which rotates cans 34 which in turn cause retained confronting jaws to engage the bed liner corrugations 22. According to the present invention, the clamp further provides anchoring points 42 in the frame portion of the clamp for rope, elastic (e.g."bunjee") bands 28, etc., to further restrict the cargo 16 motion.

Figure 2:
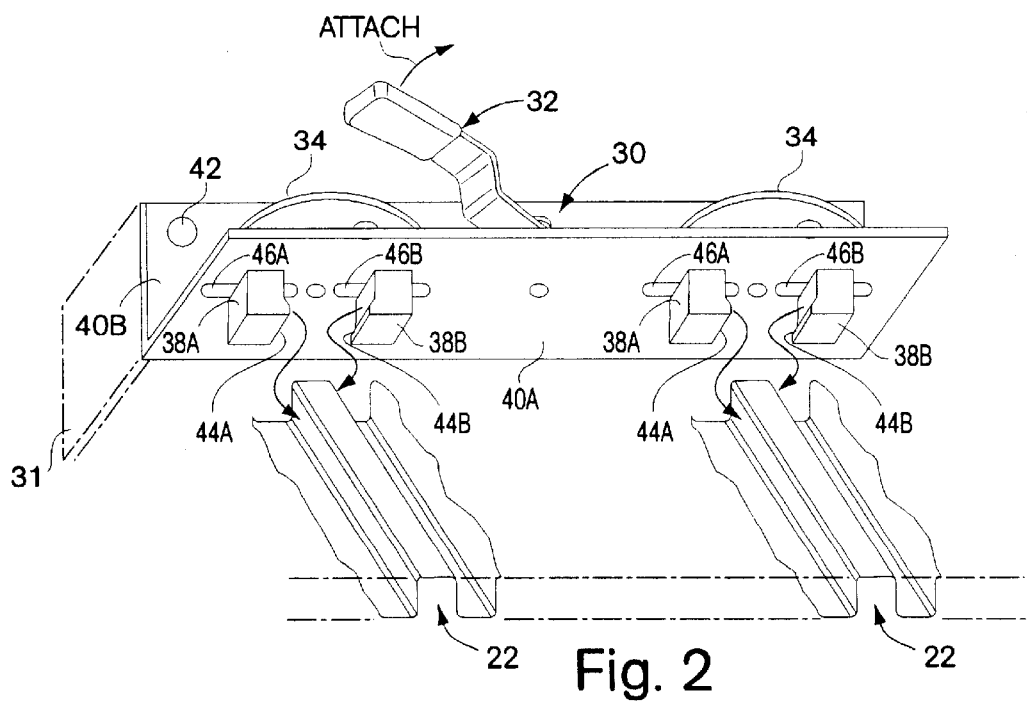
FIG. 2 is an acute perspective view of the bottom of the cargo clamp of FIG. 1 and a mating (top) portion of a corrugated bed liner.

A more revealing view of the construction and operation of the clamp 30 and bed liner corrugation 22 according to one embodiment of the present invention is shown in FIG. 2, wherein the bed liner corrugations 22 are engaged by confronting jaws 38A and 38B which are slidably retained by the lower (flat) portion 40A of the clamp frame in grooves 46A and 46B thereof. The confronting and corrugation (22) engaging motion is imparted to jaws 38A and 38B by grooved disks 34 which serve to translate the rotational motion of the operator handle 32 (shown in the "released" position in FIG. 2) into a more linear motion of the jaws 38A and 38B, as explained in more detail, below. To further increase the gripping and retaining ability of the jaws 38A and 38B, a protrusion or abrasive region 44A and 44B is provided on the corresponding jaws, preferably but not necessarily toward the outer extreme of each of the jaws 38A and 38B.

An optional corner flange 31 may be included to further secure the cargo from lateral movement, having a length equal to or less than the width of the frame 30, and mounted thereto. Moreover, the corner flange 31 may be made removable from the frame 30 by means known in the art.

Figure 3:
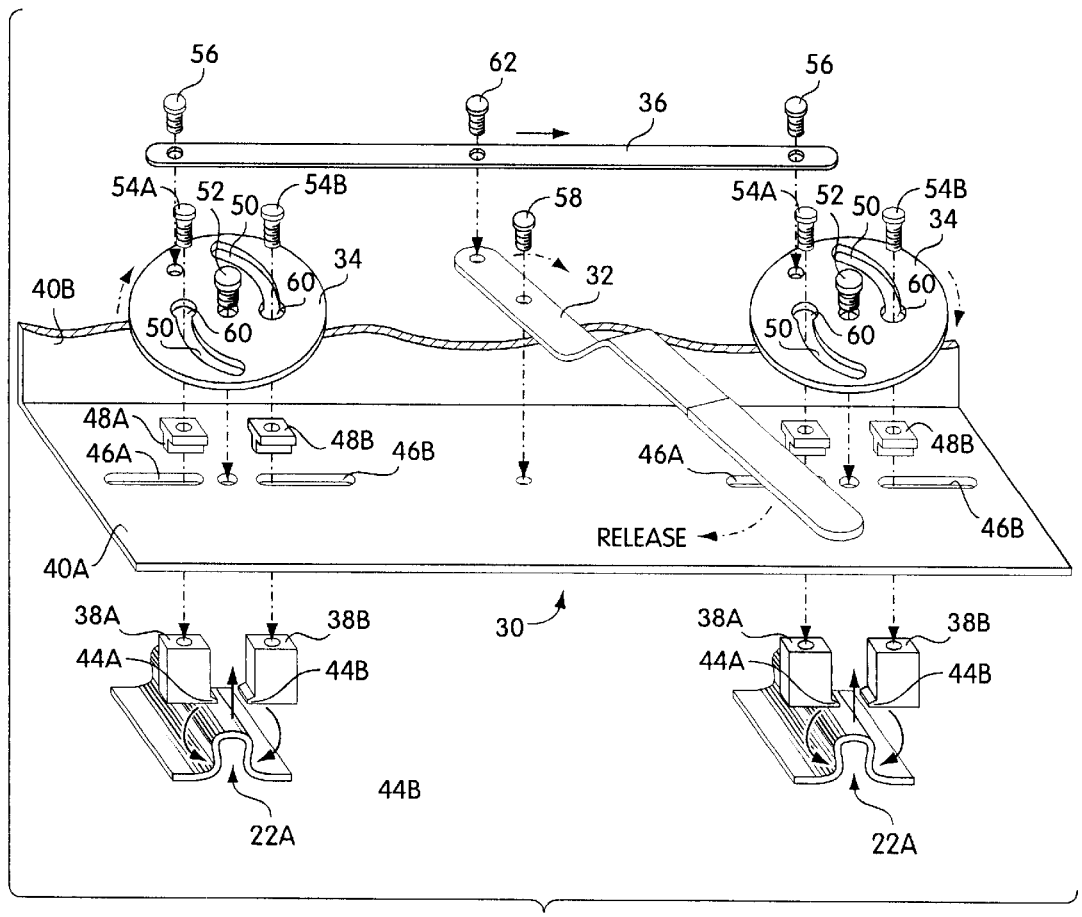
FIG. 3 is a upper perspective exploded view of the clamp according to FIG. 2.

An exploded perspective view of the clamp according to one embodiment of the present invention is shown in FIG. 3, wherein the jaws 38A and 38B are retained within the grooves 46A and 46B by shoulder screws 54A and 54B, and groove 46A and 46B sliding spacers 48A and 48B. The shoulders of the screws 54A and 54B ride within the spiral (variable radial distance) grooves 50 within disks 34 and urge the jaws 38A and 38B together (or apart) as the disks are rotated about pivot screw 52 which fastens each of the disks 34 to the lower portion 40A of the clamp frame. Two (or optionally more) disks 34 are connected to and operated by a rotatable operator lever handle 32 (shown in the "engaged" position), with a linkage 36 pivotally secured by screws 56 and 62. For clarity, the vertical portion 40B (which includes the anchor apertures 42), is partially cut away.

In the "engaged" position, the protrusions 44A and 44B of the jaws 38A and 38B, respectively act to engage the bed liner corrugation 22A, shown partially compressed.

Figure 4:
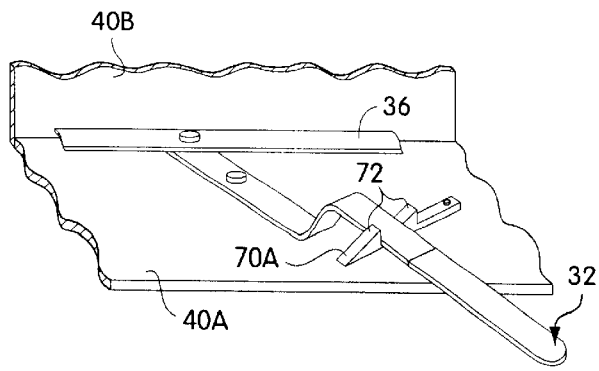
FIG. 4 is a perspective view of a portion of the clamp according to FIG. 3, showing an exemplary retained-position latch.

Furthermore, several means for locking or retaining the clamp in the engaged position is provided according to the present invention. The embodiment 30 of FIG. 3 provides radially outward indentations 60 in the spiral grooves 50 which allow the expansive force imparted by the bed liner corrugations via the jaws and screws 54A and 54B to define a local compression force minimum in which the disks 34 rotationally remain, until urged out of by operation of handle 32 to the "released" position. An exemplary alternate locking or handle retaining device 70 is shown in FIG. 4, which is mounted to clamp frame member 40A and includes a sequence of engaging toothed members 72 which are resiliently biased to selectively engage and retain the operator handle 32 in the "engaged" position. The multiplicity of toothed members allows various degrees of engagement to be selected, or variously dimensioned bed liner corrugations to be engaged. The toothed members 72 are depressed away from the handle 32, permitting the handle 32 to move to the "released" position.

Alternate embodiments of the clamp according to the present invention includes slidably movable pairs or pluralities of jaws which are disposed in the spaces between the ridges and additionally move outward (away from each other) to grasp facing vertical surfaces of the truck bed liner corrugations 22, and may also include corresponding protrusions (similar to 44A, 44B) to more securely engage the truck bed liner while the preferred embodiment secures the clamp to bed liner corrugations 22 having an interval roughly corresponding to the center of the jaw 38A and 38B pairs, other corrugation intervals are accommodated by the clamp according to the present invention wherein the slots 50 are extended to accommodate other corrugation spacings, even to include spacings wherein only a subset of the clamps 38A, 38B engage the corrugations 22, e.g. the outermost jaws or an inner pair. Also, the present invention includes other lever-to-jaw linkages and connections adapted to urge the jaws to grip the bed liner. Furthermore, anchoring means, such as hooks or other protrusions, clamps, magnets, etc. in place of the apertures 42 are included in the present invention. Other modifications and substitutions by one of skill in the art are within the scope of the present invention, which is not to be limited except by the claims, below.

What is claimed is:

1. A Cargo Clamp adapted to engage and become secured to at least one of a plurality of protrusions extending outward from a substantially planar region, comprising:
   a pair of opposing jaws, wherein each jaw of the pair of jaws is disposed to engage and secure at least a portion of one of said protrusions;
   an operator lever movable between an a released and a secured position; and
   a linkage for connecting at least of said jaws of said pair of opposing jaws with said operator lever, including a cam to translate applied motion into confronting and oppositional motion of said jaws in said pair of opposing jaws, wherein
   said linkage connected jaw is releasably fastened to a corresponding one of said protrusions when said operator lever is in said secured position.

2. The Cargo Clamp of claim 1, further comprising a plurality of pairs of jaws, said plurality of jaws inducing said pair of opposing jaws, wherein said linkage connects at least one of each of said plurality of jaws to said operator lever.

3. The Cargo Clamp of claim 1, further comprising a frame to which said operator lever and said pair of jaws is attached.

4. The Cargo Clamp of claim 3, further including anchoring means adapted to receive at least one of ropes, elastic bands and strapping members thereon comprising a member connected to said frame.

5. The Cargo Clamp of claim 3, further including a flange connected substantially perpendicular to said frame.

6. The Cargo Clamp of claim 1, wherein said linkage includes a rotational-to-linear motion translator.

7. The Cargo Clamp of claim 6, wherein said cam comprises a rotatable disk having spiral grooves which urge at least one of said opposing jaws to move in a linear motion to engage said protrusion.

8. The Cargo Clamp of claim 7, further including a longitudinally movable member connecting said operator lever with said rotatable disk for operation thereof.

9. The Cargo Clamp of claim 1, wherein said protrusions comprise individual corrugations of a corrugated truck bed liner.

10. A Cargo Securing System for securing cargo within a shipping vehicle having a surface on which cargo is carried, comprising:
    a surface liner having a plurality of protrusions extending outward from a substantially planar surface;
    a pair of opposing jaws, wherein said pair of jaws is disposed to engage and secure at least a portion of one of said protrusions;
    an operator lever movable between a released and a secured position;
    a linkage for connecting said pair of opposing jaws with said operator lever, including a cam to translate applied motion into confronting and oppositional motion of said jaws in said pair of opposing jaws, wherein
    said pair of opposing jaws is releasably fastened to a corresponding one of said protrusions when said operator lever is in said secured position; and
    a frame to which said operator lever and said pair of jaws is attached disposed adjacent to said cargo to limit motion thereof on said surface liner.

11. The Cargo securing System of claim 10, further comprising a plurality of pairs of jaws, said plurality of pairs of jaws including said pair of opposing jaws, wherein said linkage connects a least one of each of said plurality of jaws to said operator lever.

12. The Cargo Securing System of claim 10, further including anchoring means adapted to receive at least one of ropes, elastic bands and strapping members thereon comprising a member connected to said frame.

13. The Cargo Securing System of claim 10, wherein said linkage includes a rotational-to-linear motion translator.

14. The Cargo Securing System of claim 13, wherein said cam comprises a rotatable disk having spiral grooves which urge at least one of said opposing jaws to move in a linear motion to engage said protrusion.

15. The Cargo Securing System of claim 14, further including a longitudinally movable member connecting said operator lever with said rotatable disk for operation thereof.

16. The Cargo Securing System of claim 10, wherein said surface liner comprises a corrugated bed liner, and said protrusions comprise individual corrugations of said corrugated bed liner.

* * * * *